United States Patent [19]

Murakami et al.

[11] Patent Number: 4,560,977

[45] Date of Patent: Dec. 24, 1985

[54] VECTOR QUANTIZER

[75] Inventors: Tokumichi Murakami; Kohtaro Asai, both of Kanagawa, Japan

[73] Assignee: Mitsubishi Denki Kabushiki Kaisha, Tokyo, Japan

[21] Appl. No.: 503,474

[22] Filed: Jun. 13, 1983

[30] Foreign Application Priority Data

Jun. 11, 1982 [JP] Japan .................... 57-100516
Oct. 26, 1982 [JP] Japan .................... 57-187906

[51] Int. Cl.$^4$ ............................................. G06G 7/00
[52] U.S. Cl. .............................. 340/347 AD; 364/807; 340/347 M
[58] Field of Search ................... 340/347 AD, 347 M; 364/807, 745

[56] References Cited

U.S. PATENT DOCUMENTS

| | | | |
|---|---|---|---|
| 4,107,669 | 8/1978 | Tewksbury | 340/347 AD |
| 4,152,691 | 5/1979 | Ward | 340/347 AD |
| 4,280,191 | 7/1981 | Rockett, Jr. | 340/347 AD |
| 4,281,319 | 7/1981 | Roberts, Jr. | 340/347 AD X |

Primary Examiner—B. Dobeck
Attorney, Agent, or Firm—Sughrue, Mion, Zinn Macpeak & Seas

[57] ABSTRACT

A vector quantizer receives a plurality of input signals in block form and operates to determine an output vector having the least distortion with respect to an input vector by various techniques. A coded output or output vector codetable address is output from a coder of the device for receipt by a decoder which constructs a proper output vector signal.

3 Claims, 31 Drawing Figures

VECTOR QUANTIZER

BACKGROUND OF THE INVENTION

The present invention relates to vector quantization of a block of input signals.

The principle of vector quantization will be briefly described hereunder. Assume an input vector $X=(x_1, x_2, \ldots, x_k)$ which consists of a block of input signals. Partition a K-dimensional signal space $R^k$ into a finite number of subspaces $R_1, R_2, \ldots, R_N$, and let $Y=(y_1, y_2, \ldots, y_N)$ be a set of the representative points (e.g. the center of gravity) of the respective subspaces. Producing this representative point $y_i$ as an output vector corresponding to input vector X included in the specific subspace $R_i$ is referred to as vector quantization. Vector quantization Q is defined by the following formula:

$$Q: R^k \to Y$$

wherein $$R_1 = Q^{-1}(y_i) = (X \epsilon R^k: Q(X) = y_i), \bigcup_{i=1}^{N} R_i = R^k, R_i \cap R_j = 0 \ (i \neq j).$$

The vector quantization Q can also be defined as the cascade connection of coding (C) and decoding (D). Coding C is the mapping of $R^k$ onto an index set $J=(1, 2, \ldots, N)$ for the output vector set $Y=(y_1, y_2, \ldots y_N)$, whereas decoding D is the mapping of J onto Y. These relations are expressed as follows:

$$C: R^k \to J, \ D: J \to Y, \ Q = D \cdot C$$

In vector quantization, it is the coded output J that is transmitted or recorded.

Vector quantization achieves a particularly efficient quantization when the incoming signals have a certain correlation as in video or audio signals, or if the probability density of the amplitudes of the signals have some deviation. As a further advantage, data compression can be accomplished by transmitting or recording a coded output including fewer sets of output vectors.

The conventional quantizer of the type contemplated by the present invention relies on scalar quantization wherein individual input signal samples are quantized to corresponding output signal levels. A schematic diagram of the conventional scalar quantizer is shown in FIG. 1, wherein 1 represents a sequence of input signals $x_1, x_2, \ldots, x_k$ (k is an integer), 2 is the scalar quantizer, and 3 is a sequence of output signals $y_1, y_2, \ldots y_k$ produced by converting the respective sample of signal sequence 1 to corresponding quantized levels.

Suppose the amplitude probability density distribution of input pulses 1 describes a Gaussian curve with the origin positioned at the center. The conventional scalar quantizer for minimizing the distortion between the input signal sequence 1 and output signal sequence 2 has the characteristics shown in FIG. 2, where in the quantized levels become coarser as they depart from the origin. However, if the respective sample of input signal sequence 1 are correlated to each other, the conventional technique of quantizing individual samples for providing minimum distortion does not assure optimum quantization of the output signal sequence.

In the conventional method of quantizing color video signals, samples from each of the red (R), green (G) and blue (B) channels are individually quantized in parallel with respect to each channel. FIG. 3 is a schematic representation of the conventional scalar quantizer for processing color video signals, wherein 201 is a sequence of input red video signals, 202 is a sequence of input green video signals, 203 is a sequence of input blue video signals, 204 is a scalar quantizer, 205 is a sequence of red video signals, 206 is a sequence of output green video signals, and 207 is a sequence of output blue video signals.

The scalar quantizers 204 quantize individual samples of R, G and B input signals in parallel with respect to each channel. To achieve good color balance among the three channels, uniform quantization characteristics are employed as shown in FIG. 4. However, adjacent samples from the same channel, or samples in the same picture element from two different channels are so closely correlated to each other that a considerable quantization loss occurs in the scalar quantizer of FIG. 3.

A specific probability model can be assumed for the a.c. component of a video or audio signal, but such model fitting is difficult for the d.c. component.

When the amplitude varies greatly, efficient coding cannot be realized by a fixed vector quantizer.

In the operation of the coder of the conventional vector quantizer, the distortion computing section provides a critical path for the overall processing efficiency. If the time required for computing the distortion between input and each output vector is expressed by td, the coding time $t_v$ for each sample is:

$$t_v = N \cdot td/K \text{ (sec/sample)}.$$

As described above, the conventional vector quantizer must make a full search of all elements of an output vector set with respect to the input vector in order to detect the least distorted output vector. Therefore, if the number of output vectors N is increased for the purpose of accomplishing high-fidelity vector quantization with minimum quantization noise, the processing time per sample is also proportionately increased.

Further, schematic representation of the conventional interframe coding apparatus of the type contemplated by the present invention is given in FIG. 5, wherein (a) is a coder and (b) is a decoder. In FIG. 5, is an A/D converter, 602 is a subtractor 604 is a scalar quantizer, 605 is an adder, 603 is a frame memory and 612 is a D/A converter.

Suppose the f-th frame (f being an integer) is being raster-scanned from top to bottom and from left to right. The analog video signal 606 of that frame is digitized in the A/D converter 601. Here, sequence of samples of this digital video signal 607 is denoted by $S_f$ (t being the number of the sample sequence under raster-scanning); a predictive signal 608 made from the sampled value $S_f$ on the same position of the previous frame is denoted by $\hat{P}_f$; a signal 609 for the interframe difference between the video signal 607 and the predictive signal 608 is denoted by $\epsilon_f$; a scalar quantized signal 610 per sample of the interframe differential signal 609 is denoted by $\hat{\epsilon}_f$; and a reproduced video signal 611 which is the sum of the scalar quantized signal 610 and the predictive signal is denoted by $\hat{S}_f$.

Given these signals, the coder of FIG. 5(a) performs the following operations:

$$\epsilon_f = S_f - \hat{P}_f$$

$$\hat{\epsilon}_k{}^f = \epsilon_k{}^f + q_k{}^f$$

$$\hat{S}_k{}^f = \hat{P}_k{}^f + \hat{\epsilon}_k{}^f = S_k{}^f + q_k{}^f$$

wherein $\hat{P}_k{}^f = S_k{}^f \cdot Z^{-f}$ ($Z^{-f}$ indicating a one-frame delay), and $q_k{}^f$ represents scalar quantization noise. As is clear from these formulas, the interframe differential signal $\epsilon_k{}^f$ whose power is smaller than $S_k{}^f$ because of the signal correlation is scalar-quantized to $\hat{\epsilon}_k{}^f$ by reducing the number of quantizing level so that the quantization noise is a minimum with respect to the amplitude probability distribution $P(\epsilon_k)$ of that differential signal. Proper codes may be assigned to the respective quantizing levels of $\hat{\epsilon}_k{}^f$ for high-efficiency coding and subsequent data transmission.

In the decoder of FIG. 5(b), the incoming scalar-quantized signal 610 is subjected to the operation $\hat{S}_k{}^f = \hat{P}_k{}^f + \hat{\epsilon}_k{}^f = S_k{}^f + q_k{}^f$ so as to provide a reproduced video signal 611 containing the quantization noise $q_k{}^f$.

As described above, in the conventional interframe coding apparatus, the signal indicating the difference between the video signal for the present frame and that for the previous frame at the same position is subjected to scalar quantization by reducing the number of quantizing levels per sample. However, because of the presence of Gaussian noise in the video signal, this method involves much difficulty in coding only the significant interframe differential signal that has been generated by the movement of the pictorial object. Furthermore, since scalar quantization is performed on each sample of the interframe differential signal, it is impossible to make the bit rate lower than a certain value.

SUMMARY OF THE INVENTION

The present invention has been accomplished to eliminate the drawbacks of the conventional quantizer described above. An object of the present invention is to provide a vector quantizer that samples a specific block of input signals and converts them into a corresponding block of output signals at a time.

Another object is to provide a vector quantizer capable of efficient coding of color video signals by vector-quantizing signal blocks each consisting of signals from R, G and B channels.

Yet another object is to provide a vector quantizer that assures continuity on the boundary between each block of incoming signals by first scalar-quantizing the mean of the signals in each block and then vector-quantizing any variance component from the mean.

Yet another object is to provide an adaptive vector quantizer capable of optimum vector quantization of all input signals in block form. This object can be attained by normalizing only the a.c. signal component left after subtracting the mean for the block from the input signals and by adaptively controlling the amplitude of the output vector with the variance in the block.

Still another object is to provide a high-speed vector quantizer that is capable of processing N output vectors within a period proportional to $\log_2 N$.

Still another object is to provide an interframe coding apparatus that is reasonably protected against disturbances such as Gaussian noise and which performs vector quantization only on blocks of interframe differential signals that have been found to indicate significant scene movements.

DETAILED DESCRIPTION OF THE PREFERRED EMBODIMENTS

EXAMPLE 1

Figure 3:
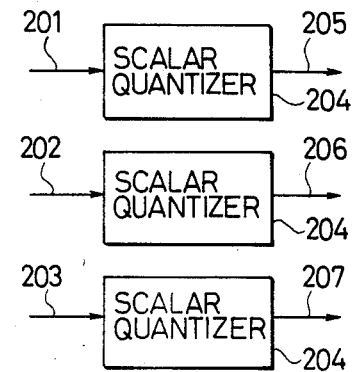
FIG. 3 is a schematic representation of a conventional scalar quantizer for processing color video signals.
Figure 1:
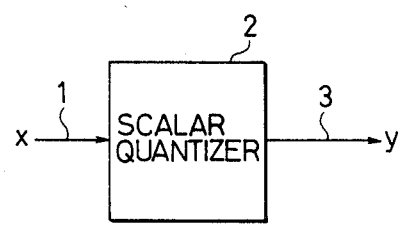
FIG. 1 is a schematic representation of a convention scalar quantizer.
Figure 2:
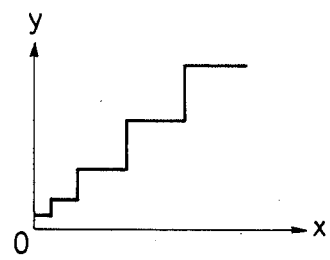
FIG. 2 shows the quantization characteristics of the conventional scalar quantizer.
Figure 4:
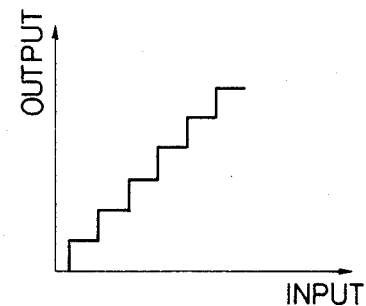
FIG. 4 illustrates the quantization characteristics of the device of FIG. 3.
Figure 5A:
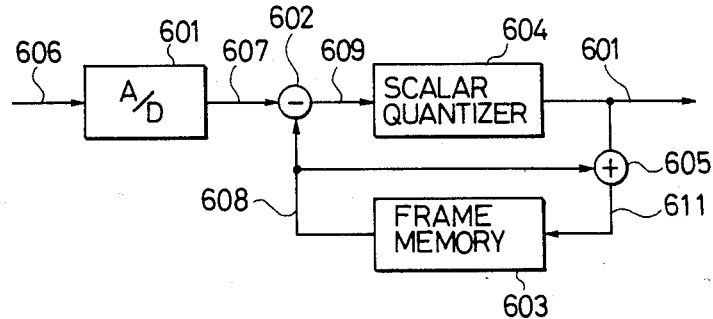
FIGS. 5(a) and 5(b) are block diagrams of a conventional interframe coding apparatus.
Figure 5B:
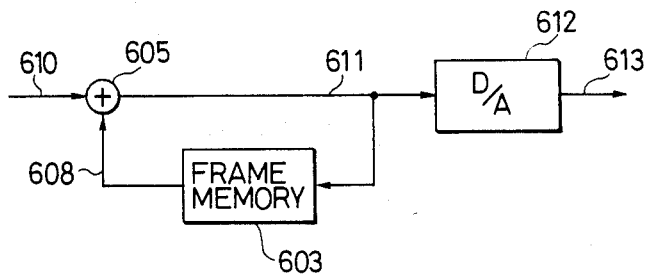
Figure 6:
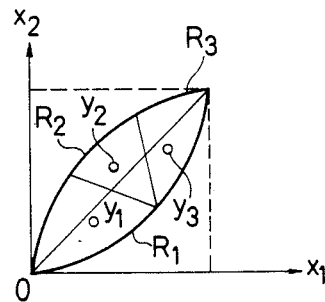
FIG. 6 shows the quantization characteristics of the vector quantizer of the present invention.

The above noted block quantization technique assures efficient quantization if the component of the input vector X are correlated to each other. The arrangement of output vectors in the signal space produced by two-dimensional vector quantization is shown in FIG. 6. If there is a correlation between two input signals $x_1$ and $x_2$, the distribution of their amplitudes is localized in the vicinity of $x_1 = x_2$. Therefore, a subspace $R_i$ wherein the vector sum of the differences between input and output vectors is a minimum and its representative point $y_i$ (e.g. the center of gravity) can be optimized by clustering of actual input data as shown in FIG. 6. In this case, the input vectors contained in the subspace $R_i$ are mapped into an output vector $y_i$. The diagram of FIG. 6 assumes $x_1 > 0$ and $x_2 > 0$.

Figure 7:
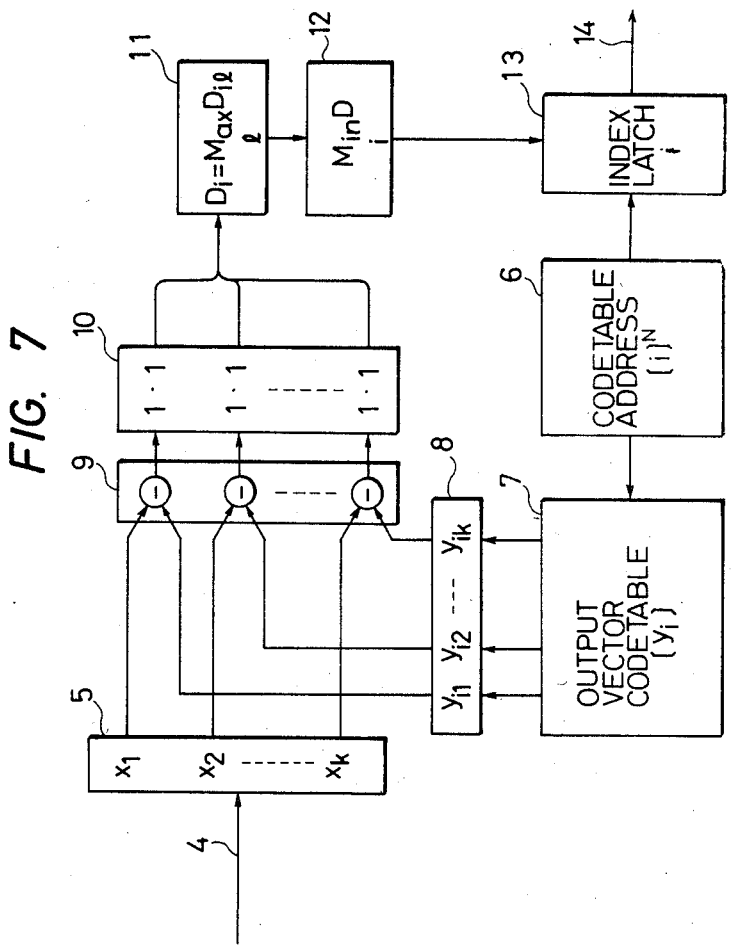
FIG. 7 is a block diagram of one embodiment of the coder of the vector quantizer according to the present invention.
Figure 8:
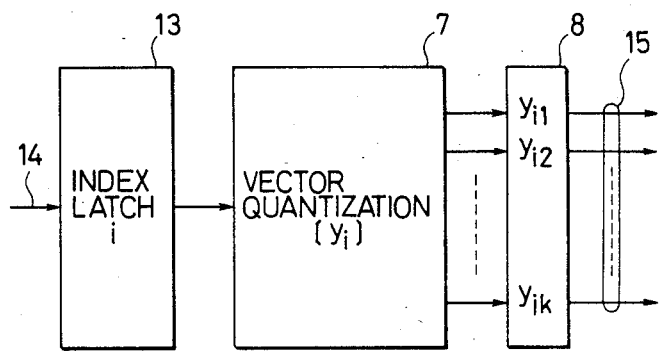
FIG. 8 is a block diagram of one embodiment of the decoder of the vector quantizer according to the present invention.

A block diagram of the coder of the vector quantizer according to the present invention is shown in FIG. 7, and a block diagram of the decoder is illustrated in FIG. 8. In these figures, 4 is an input vector X, 5 is an input vector register, 6 is a counter for addressing one of output vectors in the codetable, 7 is a codetable memory for output vector $y_i$, 8 is an output vector register, 9 is a parallel subtractor, 10 is a parallel absolute value corrector, 11 is a maximum element distortion detector, 12 is a least distorted output vector detector, 13 is an index latch for the least distorted output vector, 14 is an index signal for the least distorted output vector, and 15 is an output vector.

The vector quantizer of the present invention is operated as follows. In the coder of FIG. 7, a sequence of incoming signals are divided into blocks each consisting of K samples and are latched in the input vector register 5 as a K-dimensional input vector $X = (x_1, x_2, \ldots, x_k)$ (the respective components correspond to the sampled values). At the same time, output vectors $y_i$ that have been found to have minimum distortion according to the probability density of actual input vectors are successively read out from the codetable memory 7. The output vectors $y_i$ are fed to the output vector register 8 in the order $i = 1, 2, \ldots N$, and are further sent to the parallel substractor 9 and the parallel absolute value corrector 10 to calculate the absolute values of their differences from the respective components of the input vector X (these absolute values are hereunder referred to as element distortions $D_{ie} =$ ). The value $D_i$ which is the greatest of the element distortions $D^{ie} = (D_{i1}, D_{i2}, \ldots D_{ik})$ is detected by the maximum element distortion detector 11. This may be accomplished by comparing every two element distortions $D_{ie}$ with respect to their vector components according to the tournament method. Subsequently, a distortion D which is the least of $D_i = (D_1, D_2, \ldots D_N)$ is detected in the least distorted output vector detector 12, and the last detected minimum distortion is replaced by a new one responsive to the operation of the address counter 6 in the order of $i = 1, 2, \ldots N$. As a result, the minimum distortion D between the input vector X and output vector $y_i$ is determined as $$D = \operatorname*{Min}_{i} \left[ \operatorname*{Max}_{l} |y_{il} - x_l| \right].$$

The index i is fed to the index latch 13 from which it is delivered as an index signal i 14.

In the detector of FIG. 8, the index signal i is fed to the index latch 13 and addressed to the code table memory 7 whereupon an output vector $y_i$ corresponding to the index signal i is produced as an output signal 15.

The index signal 14 from the coder of the vector quantizer of the present invention may be used in data transmission or memory recording for the purpose of high-efficiency coding. The coding efficiency $\eta$ accomplished by the vector quantizer of the present invention is $\eta = M/K$ bits/sample on the condition that the input signals are represented by $x_1, x_2, \ldots x_k$ and $N = 2^M$. Therefore, the vector quantizer of the present invention can be used in the high-efficiency coding of video or audio data that is usually coded in the form of a block of correlated samples.

One advantage of the vector quantizer of the present invention is its high speed because it computes minimum distortions by referencing to the vector codetable paralleling vector operations, and detecting distortions by mini-max approximation.

In the foregoing description, the minimum distortion detected in the vector quantizer of the present invention is defined in terms of mini-max, but it should be understood that said distortion may be defined in terms of a Euclidean norm or the norm of an absolute value. In another embodiment, a microprocessor may be used to perform sequential vector operation for each component of the vector. Alternatively, the output vector coding table may have a tree structure and mini-max collation with the input vector may be performed by searching through this tree. If the data consists of three parallel channels of signal sequence as in color video signals, the input vector may be composed of a block of signals in two or three channels.

As described above, the vector quantizer of the present invention receives input signals in the form of a block of input vectors and has its coder cascade-connected to the decoder in such a manner that said block is converted to a block of output signals having minimum distortion by minimax approximation. Therefore, the quantizer enables high-efficiency coding of the input signals.

EXAMPLE 2

Suppose the same picture element is scanned to obtain M signals on each of the three channels: $R = (R_1, R_2, \ldots R_M)$, $G = (G_1, G_2, \ldots G_M)$ and $B = (B_1, B_2, \ldots B_M) = (x_1, x_2, \ldots x_k)$, wherein $K - 3^M$. Determine a set (Y) of output vectors which are the least distorted from the amplitude distribution of the input vector X. For this purpose, a set of the least distorted output vectors or their representative points (e.g. the center of gravity) may be obtained by clustering the input signals with a model amplitude probability density function for color video signals. Vector quantization can be considered to be a transformation to an output vector that is the closest to (the least distorted from) the input vector X.

Figure 9:
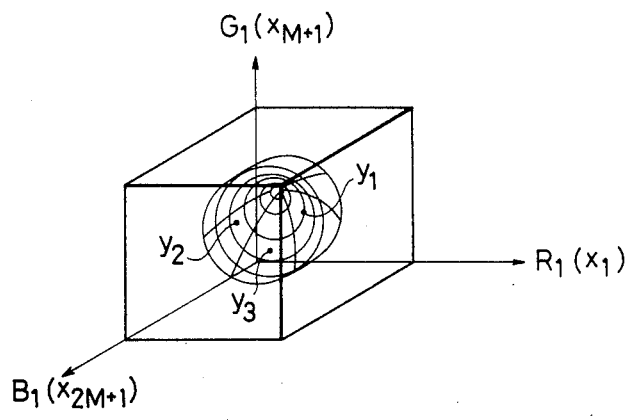
FIG. 9 shows how input and output vectors are related according to the technique of vector quantization of color video signals used in the present invention.

FIG. 9 shows the arrangement of output vectors with respect to an input vector in a three-dimensional signal space ($R_1$, $G_1$, and $B_1$). If the three signals are correlated to each other, all of the signals are distributed in the vicinity of the principal axis $R_1 = G_1 = B_1$. This suggests the great effectiveness of vector quantization which causes output vectors to be localized in the vicinity of the principal axis.

Figure 10:
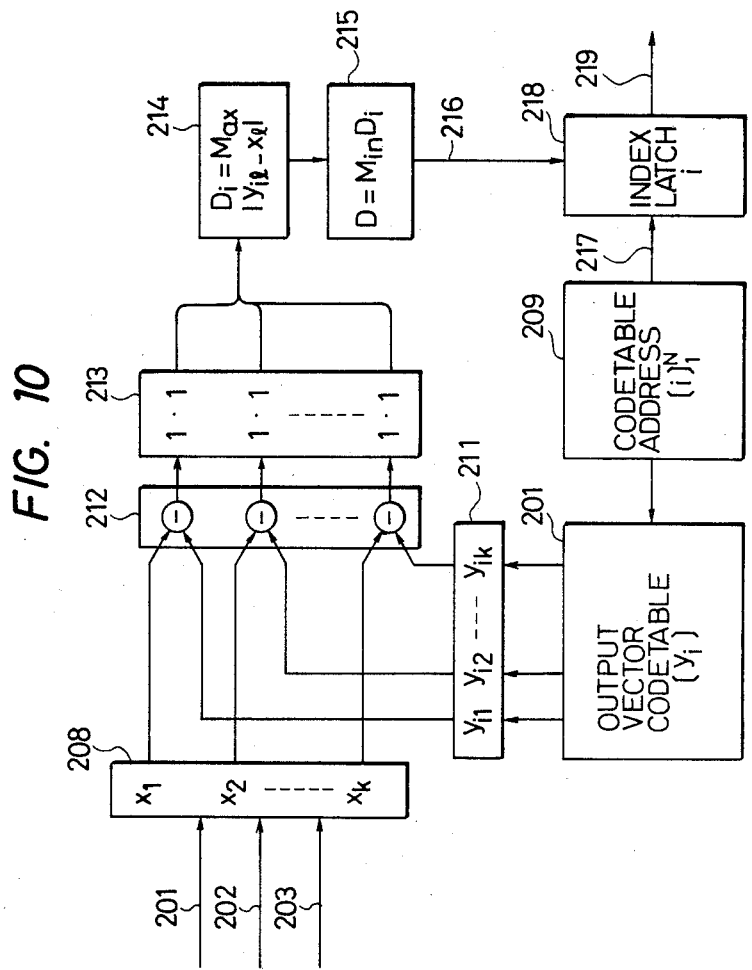
FIG. 10 is a block diagram of one embodiment of the coder of the vector quantizer according to the present invention.
Figure 11:
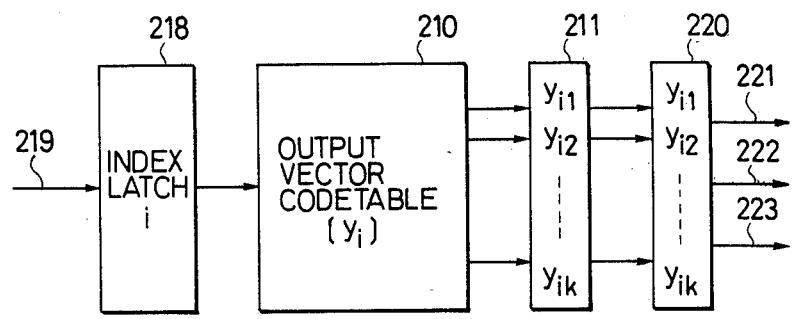
FIG. 11 is a block diagram of an embodiment of the decoder of the vector quantizer of the present invention.

FIG. 10 is a block diagram showing an embodiment of the coder of the vector quantizer for processing color video signals according to the present invention. FIG. 11 is a block diagram of the decoder of the same quantizer. In the figures, 201, 202 and 203 are red, green and blue input video signal sequence, respectively; 208 is an input vector register; 209 is a codetable address counter; 210 is an output vector codetable memory; 211 is an output vector register; 212 is a parallel subtractor; 213 is a parallel absolute value calculator; 214 is a maximum element distortion detector; 215 is a least distorted output vector detector; 216 is an index strobe signal; 217 is an index signal; 218 is an index latch; 219 is a coded output signal; 220 is an output vector decomposing register; and 221, 222 and 223 are red, green and blue video output vectors.

The coder of FIG. 10 is operated as follows. Input video signals in each of the R, G and B channels are blocked into M correlated samples to provide an input vector $X = (R_1, R_2, \ldots R_M, G_1, G_2, \ldots G_M, B_1, B_2, \ldots B_M) = (x_1, x_2, \ldots x_k)$, which is loaded into the input vector register 208. At the same time, the elements of the output vector set Y are successively read into the output vector register 211 out of the output vector code table memory 210 responsive to the operation of the coding table address counter 209 in the order of i = 1, 2, ... N. The input vector X and the output vectors $y_i$ are fed into the parallel subtractor 212 and parallel absolute value calculator 213 where they are compared with each other to calculate element distortions $D_{il} = |y_{il} - x_l|$ (wherein $l = 1, 2, \ldots x$). These are supplied to the maximum element distortion detector 214 to detect a maximum element distortion $$D_i = \max_l D_{il}$$

for each element of the output vector set Y. A plurality of the maximum element distortions are fed into the least distorted output vector detector 215 to detect an output vector $y_i$ whose maximum distortion from the input vector X is the smallest of all the elements of the output vector set Y. In other words, the detector 215 performs mini-max approximation to detect an output vector having minimum distortion D, which is represented by:

$$D = \min_i \left( \max_l |y_l - x_l| \right).$$

Upon detecting the least distorted output vector, the detector 215 sends an index strobe signal 216 to the index latch 218. At the same time, an index signal 216 for the least distorted output vector is sent from the code table address counter 209 into the index latch 218, and this signal is delivered from the latch as a coded output signal 219, which is either transmitted or recorded for transormation into the final output vector in the decoder of FIG. 11.

The decoder of the FIG. 11 is operated as follows: First, the coded output signal 219 is loaded into the index latch 218 which uses that signal as an address signal for reading a corresponding output vector from the table memory 210. The least distorted output vector so read enters the register 211 from which it is fed to the decomposing register 220 where it is decomposed into a red video output vector 221, a green video output vector 222 and a blue video output vector 223. The output vector in block form for each channel may be decomposed into vector-quantized output signals.

Assuming a block of K (= 3M) samples and the production of N (= $2^t$) output vectors, the coding efficiency ($\eta$) of vector quantization according to the present invention $$\eta = \frac{t}{K} = \frac{t}{3M}.$$

As described, the vector quantizer of the present invention can encode color video signals very efficiently because it performs vector quantization on a block of video signals including samples from each of the three channels R, G and B. Other types of color video signals in three channels may be processed in block form by the vector quantizer of the present invention, such as Y, I and Q signals or Y, Y-R, and Y-B signals sampled in different proportions (e.g. 12:4:4) according to the NTSC system. In the illustrated embodiment, an output vector having minimum distortion from the input vector is calculated by mini-max approximation, but it should be understood that the same purpose can be achieved by using the Euclidean norm or the sum of the absolute values.

In short, the vector quantizer of the present invention is capable of achieving very efficient coding of color video signals because it performs vector quantization on a block of samples from each of the three video channels.

EXAMPLE 3

Figure 12:
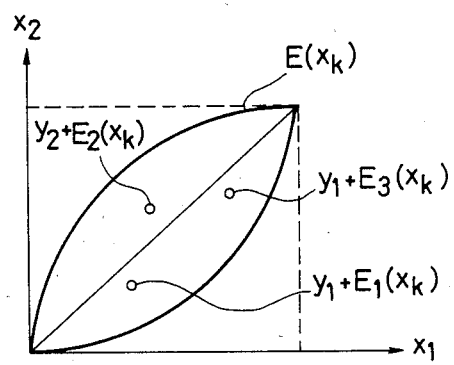
FIG. 12 shows how input and output vectors are related to the block mean values (d.c. component) according to the d.c. corrected vector quantization technique used in the present invention.

FIG. 12 shows how input and output vectors are related to the block average or mean in a two dimensional signal space according to the concept of d.c. corrected vector quantization used in this aspect of the present invention.

Figure 13:
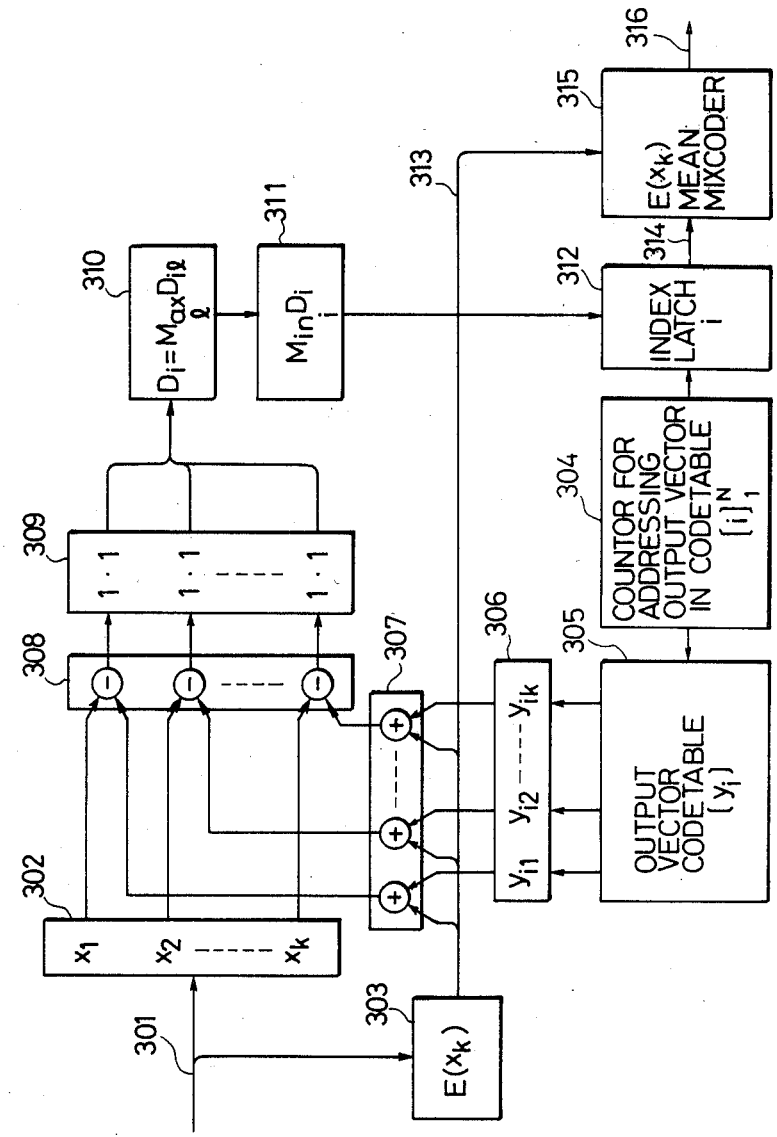
FIG. 13 is a block diagram showing one embodiment of the coder of the d.c. corrected vector quantizer of the present invention.
Figure 14:
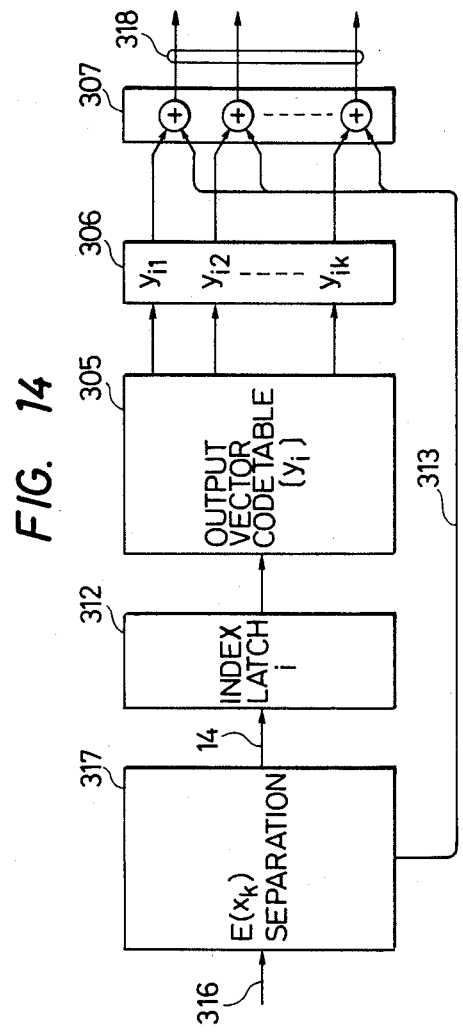
FIG. 14 is a block diagram showing one embodiment of the decoder of the d.c. corrected vector quantizer of the present invention.

FIG. 13 is a block diagram showing an embodiment of the coder of the vector quantizer of the present invention, FIG. 14 is a block diagram showing one embodiment of the decoder therefor. In the figures, 301 is an input vector, 302 is an input vector register, 303 is a mean value calculator, 304 is a counter for addressing output vectors in a codetable, 305 is an output vector codetable memory, 306 is an output vector register, 307 is a parallel adder, 308 is a parallel subtractor, 309 is a parallel absolute value calculator, 310 is a maximum element distortion detector, 311 is a least distorted output vector detector, 312 is a least distorted output vector index latch, 313 is a mean signal, 314 is an index signal, 315 is a mean mix coder, 316 is a coded output signal, 317 is a decoder for separating the mean value, and 318 is a d.c. corrected output vector.

The d.c. corrected vector quantizer of the present invention is operated as follows. In the coder of FIG. 13, a sequence of incoming signals are divided into blocks each consisting of K samples and are latched in the input vector register 302 as an input vector $X=(x_1, x_2, \ldots x_k)$. In the mean value calculator 303, the mean of the K input signals is calculated for each block, and the result is delivered as a mean signal $E(x_k)$. The output vector codetable memory 305 has as its content the least distorted subranges obtained by dividing the K-dimensional Euclidean signal space by means of a model amplitude probability density function form which the mean (d.c. component) of the input signals has been removed. The memory also contains the set Y of optimum output vectors $y_i$. The counter 304 addresses the output vectors successively from the memory 305 in the order of $i=1, 2, \ldots N$. The respective elements of the output vector Y are fed to the parallel adder 307 wherein they are summed with the mean signal 313 to provide d.c. corrected output vectors $y_i+E(x_k)$. These are fed to the parallel subtractor 308 to determine the differences from the input vector X. The obtained differences are converted to their absolute values in the parallel absolute value calculator 309 and delivered therefrom as an element distortion signal $D_{il}$ which is defined by:

$$D_{il} = |Y_{il} + E(x_k) - x_l|$$

wherein $l = 1, 2, \ldots K$.

Then, the maximum element distortion detector 310 picks as an output vector ratio $D_i$ the element distortion $D_{il}$ which is the greatest of all distortions for $l = 1, 2, \ldots K$. This ratio is defined by:

$$D_i = \underset{l}{\text{Max}} D_{il}.$$

The least distorted output vector detector 311 detects a least distorted output vector $y_i$ responsive to the counting operation of the address counter 304 in the order of $i = 1, 2, \ldots N$. The minimum distortion D is defined by:

$$D = \underset{i}{\text{Min}} D_i = \underset{i}{\text{Min}} \left[ \underset{l}{\text{Max}} |y_{il} + E(x_k) - x_l| \right]$$

A strobe signal for the detection of the least distorted output vector is sent to the index latch 312, so as to detect an index signal i for the least distorted output vector. The mean mix coder 315 encodes the mean signal 313 and index signal 314 and delivers them at a coded output. signal 316.

In the decoder of FIG. 14, the index signal 314 is separated from the output signal 316. The index signal 314 is loaded in the index latch 312 and is used as an address signal for reading the corresponding output vector $y_i$ from the table memory 305. The respective output vectors $y_i$ are fed to the parallel adder 307 where they are summed with the mean signal 313 to produce $y_i+E(x_k)$ as a d.c. corrected output vector 318.

By the procedure described above, the d.c. corrected vector quantizer of the present invention converts an input vector X to a d.c. corrected output vector that is found to be the least distorted by mini-max approximation. Assuming a block of K input signals and the production of N ($=2^s$) output vectors, with the block mean $E(x^k)$ being scalar-quantized into $2^t$ bits, the efficiency of coding by vector quantization according to the present invenion is represented by the following equation:

$$\eta = \frac{s+t}{K} \text{ bits/sample.}$$

One advantage of the d.c. corrected vector quantizer of the present invention is its high efficiency because it performs the vector quantization of input signals after removing their d.c. components, a probability model of which is difficult to prepare. The vector quantizer of the present invention can be be operated at high speed by referencing a codetable for locating the specific output vector, paralleling vector operations, and calculating distortions by mini-max approximation. In another embodiment, a microprocessor may be used to perform sequential d.c. corrected vector quantization.

In the foregoing embodiment, the block mean is used for correcting the d.c. components of input signals before they are vector-quantized, but it should be understood that the median of the block may be used in place of the block mean. In addition, the minimum distortion is detected by mini-max approximation, but this may be replaced by the Eucilidean norm or the sum of absolute values. In the illustrated embodiment, a full search of the output vector table is made, but the searching speed can be increased by configuring the table in a tree structure and making a binary search. The input vector need not be sequential samples of one input signal train, and instead, two dimensional adjacent samples such as video signals may be fed in block form. Another input vector that can be used is one which consists of a block of three signal channels as in a color video signal. The RARCOR coefficient of an audio signal may also be processed by the vector quantizer of the present invention.

As described, the d.c. corrected vector quantizer of this embodiment separates the d.c. component from the input vector before it is subjected to vector quantization. Therefore, efficient coding of the input signal can be accomplished without forming a boundary between each block of input signals.

EXAMPLE 4

Figure 15:
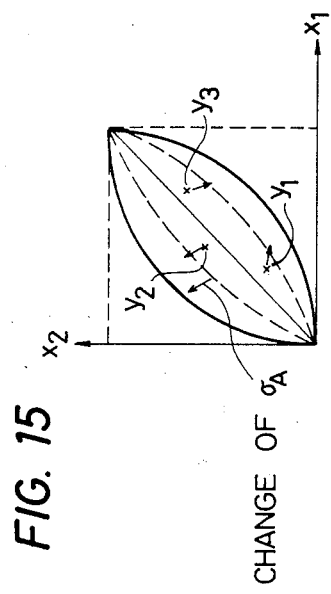
FIG. 15 shows how input and output vectors are controlled adaptively in the adaptive vector quantizer of the present invention.

Assume an output vector $y_i$ corresponding to an input vector X. Remove the block mean $m_A=E_A(x_l)$ (A denotes am arithmetic operation in the block) from the output vector $y_i$, and normalize the result using the standard deviation $\sigma_A = [E_A\{(x_l-m_A)^2\}]^{\frac{1}{2}}$ to provide $Y' = (y'_1, y'_2, \ldots, y'_N)$ which is a set of the normalized output vectors $Y'_i$. FIG. 15 shows the relation betweeh the input vector X and output vectors $y_i$ which are adaptively controlled by the standard deviation of the input vector X.

Figure 16:
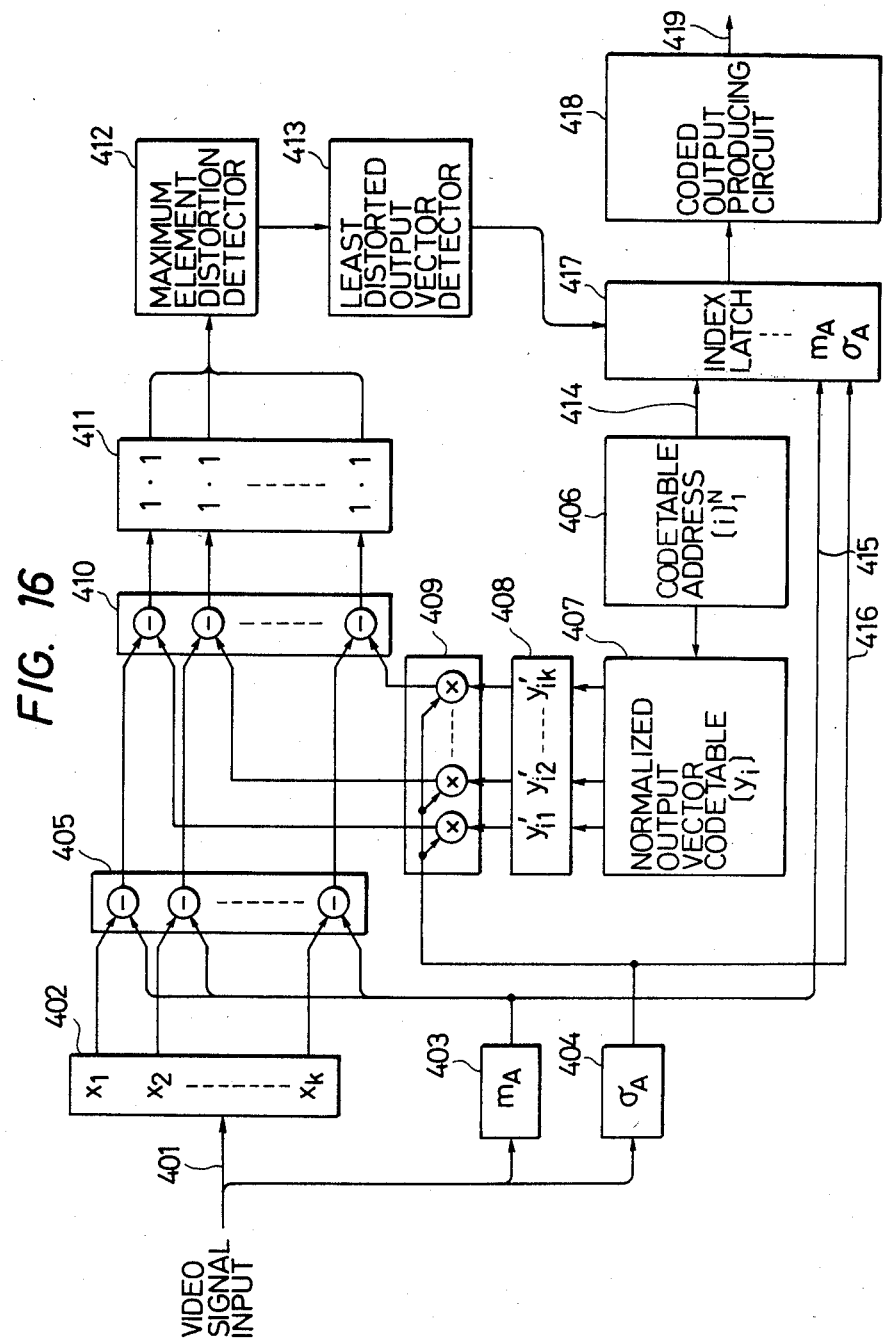
FIG. 16 is a block diagram showing one embodiment of the coder of the adaptive vector quantizer of the present invention.
Figure 17:
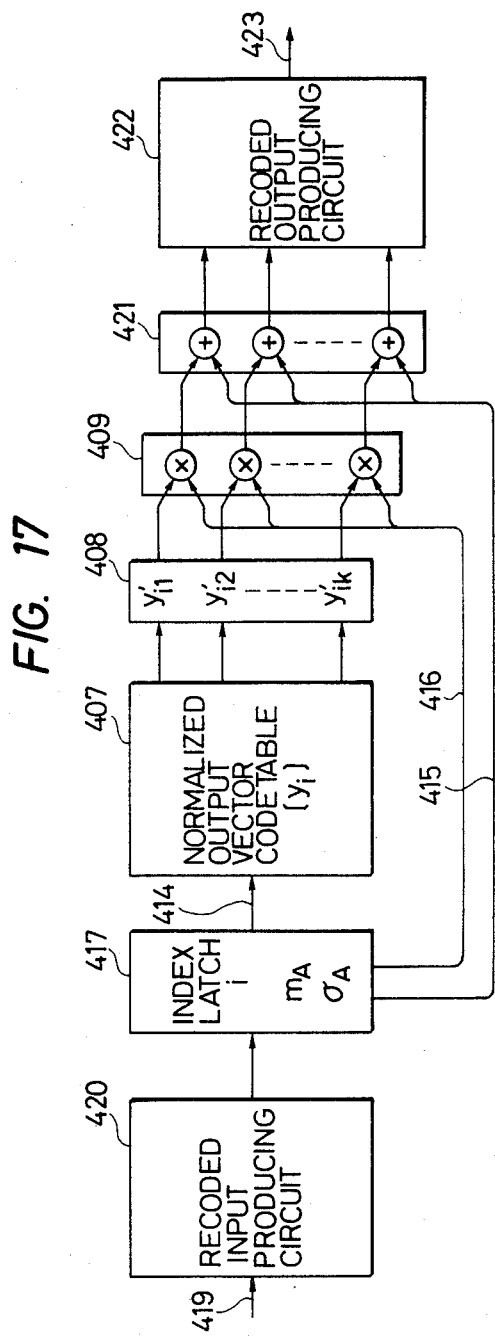
FIG. 17 is a block diagram showing one embodiment of the decoder of the adaptive vector quantizer of the present invention.

FIG. 16 is a block diagram showing one embodiment of the coder of the vector quantizer according to a further embodiment of the present invention. FIG. 17 is a block diagram of the decoder of the vector quantizer. In these figures, 401 is an input vector, 402 is an input vector register, 403 is a mean value calculator, 404 is a standard deviation calculator, 405 and 410 are parallel subtractors, 406 is a coding table address counter, 407 is a normalized output vector codetable memory, 408 is normalized output vector register, 409 is a parallel multiplier, 411 is a parallel absolute value calculator, 412 is a maximum element distortion detector, 413 is a least distorted output vector detector, 414 is an output vector index, 415 is a block mean signal, 416 is a block standard deviation signal, 417 is an index latch, 418 is a coded output producing circuit, 419 is a coded output signal, 420 is an input circuit in the decoder, 421 is a parallel adder, 422 is an output circuit in the decoder, and 423 is an output vector.

The coder of FIG. 16 is operated as follows. First, incoming signals are divided into blocks each consisting of K samples and are latched in the input vector register 402 402 as an input vector $X=(x_1, x_2, \ldots, x_k)$ At the same time, the mean value calculator 403 and the standard deviation calculator 404 calculate the scalar mean $m_A$ and the standard deviation $\sigma_A$ of the input vectors $x_1$ of one block. The two parameters are represented by the following formulas:

$$m_A = E_A(x_l) = \frac{1}{K} \sum_{l=1}^{k} x_l$$

$$\sigma_A = [E_A(x_l - m_A)^2] = \left[ \frac{1}{K} \sum_{l=1}^{k} (x_l - m_A)^2 \right]^{\frac{1}{2}}$$

The respective input vectors are then supplied to the parallel subtractor 405 where the block mean $m_A$ is subtracted from each input vector to produce a d.c. component free input vector $X'=(x_1-m_A, x_2-m_A, \ldots, x_k-m_A)$. The next step is to search for a normalized output vector $y'_i$ that fits the d.c. component free input vector $X'$. To this end, normalized output vectors $y'_1, y'_2, \ldots, y'_N$ are read from the coding table 407 in response to the operation of the address counter 406 in the order of $i=1$ to N. The set (Y') of these normalized output vectors $y'_1$ can be predetermined by a procedure in which d.c. component free input vectors $x'_1$ are produced using a model set of input vectors $x_1$ having a preselected amplitude probability density; these vectors are normalized using the standard deviation for one block; and clustering is performed on the normalized input vector set $X''=\{(x_1-m_A)/\sigma_A, (x_2-m_A)/\sigma_A \ldots, (x_k-m_A)/\sigma_A\}$ by dividing the K-dimentional signal space containing this set into least distorted subspaces and selecting their representative points (normalized output vectors). For performing efficient clustering until subspaces having minimum distortion and their representative points (e.g. the centers of gravity) are obtained, the distortion may be defined in terms of the Euclidean norm or mini-max approximation.

The normalized output vectors $y'_i=(y_{i1}, y_{i2}, \ldots, y_{ik})$ being successively read from the table memory 407 are latched in the register 408 before they are fed to the parallel multiplier 409 where they are multiplied by the block standard deviation $(\sigma_A)$ The outputs from the multiplier 409 and subtractor 405 are fed to the parallel subtractor 410 and parallel absolute value calculator 411, wherein the following operation is performed on each element of the K-dimentional vector set to determine an element distortion $D(=1, 2, \ldots, K)$:

$$D_{il} = |\sigma_A \cdot y'_{il} - (x_l - m_A)|$$

wherein $y_{il} = \sigma_A \cdot y'_{il} + m_A$ is an output vector corresponding to input vector $x_l$.

The minimum element distortion detector 412 detects a maximum element distortion $D_i$ for $l=1, 2, \ldots, K$ and sends $D_i$ to the least distorted, normalized output vector detector 413, which detects a minimum distortion $D_i$ for $i=1, 2, \ldots, N$ and sends it to the index latch 417, which is also provided with the index i 414, the block mean $m_A$ 415 and the block standard deviation $\sigma_A$. The minimum distortion D is calculated by the following formula:

$$D = \underset{i}{\text{Min}} D_i = \underset{i}{\text{Min}} \left( \underset{l}{\text{Max}} D_{il} \right).$$

The index 414 for the least distorted normalized output vector, the block mean 415 and the block standard deviation 416 are encoded altogether in the output circuit 418 and a single coded output signal 419 is delivered from that circuit.

In the decoder of FIG. 17, the coded output signal 419 is decoded through the input circuit 420 and the resulting output vector index 414, block mean 415 and block standard deviation 415 are loaded in the index latch 417. The output vector index 414 is fed to the normalized output vector codetable memory 407 where it is used as an address signal to read a corresponding normalized output vector $Y'_1$ from that memory. After being latched in the register 408, a set of the normalized output vector $y'_1$ is fed to the parallel multiplier 409 for multiplication by the block standard deviation 416, then fed to the parallel adder 421 for summation with the block mean 415. The output signal from the parallel adder 421 is sent to the output circuit 422 where any overshoot or undershoot is eliminated from each element by a limiter, so as to provide an output vector 423 having minimum distortion from the input vector 401. The arithmetic operation necessary for reconstructing the least distorted output vector $y_i$ is expressed by $y_i = \sigma_A \cdot y'_i + m_A$.

As described above, the adaptive vector quantizer of this embodiment processes input signals using normalized vectors with a basic structure freed of the d.c. component and a.c. amplitude that defy simple modeling. Therefore, the quantizer of the present invention can perform efficient vector quantization on every type of signal.

It should be understood that the adaptive vector quantizer can be used with a microprocessor or other devices for sequential processing. In the illustrated embodiment, the block mean and block standard deviation are separated from the input signals as their d.c. component for the purpose of providing a faster circuit, but the two parameters may be replaced by the block median and the block deviation median, respectively. In another embodiment, the average for two or more blocks, rather than for one block, may be separated as the d.c. component. It should also be noted that not all significant digits of the d.c. component are necessary for the arithmetic operations described above, and only the most significant bit may be separated from the input signals while the remainder is subjected to vector quantization.

As described in the foregoing, the adaptive vector quantizer performs vector quantization on only the basic component of the input signals and lets the other components follow the processing adaptively. Because of this feature, the present invention accomplishes efficient vector quantization with every type of input signals.

EXAMPLE 5

Turning now to another embodiment of the invention, the algorithm used in operating a high-speed vector quantizer according to this example of the invention is hereunder described by reference to FIGS. 18 and 19. Vector quantization is essentially the partition of a multidimentional signal space into a finite number of subspaces, so in performing high-speed vector quantization according to the present invention, the signal space $R^k$ is partitioned into n ($=\log_2 N$) stages. In the first stage, the space $R^k$ is partitioned into two subranges $R_0$ and $R_1$ which have representative points $y'_1$ and $y'_2$, respectively. In the second stage, $R_0$ is partitioned into $R_{00}$ and $R_{01}$, and $R_1$ into $R_{10}$ and $R_{11}$, thus providing four subspaces which have representative points $y_1^2$, $y_2^2$, $y_3^2$ and $y_4^2$, respectively. By continuing this operation to the nth stage, a set of N subspaces $R_n(B)_1$ or $R_n(B)_0$ is obtained. The symbol n(B) is a binary representation of the history of partition up to the last (n−1) stage. The representative subranges have their representative points $y_{i(B)1}^n$ or $y_{i(B)0}^n$.

Figure 18A:
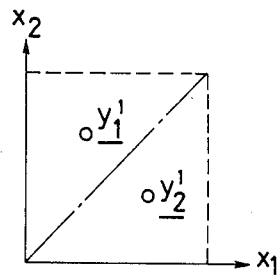
FIGS. 18a, 18b and 18c show in steps the mapping of output vectors onto an input vector according to the method of vector quantization used in the present invention.
Figure 18B:
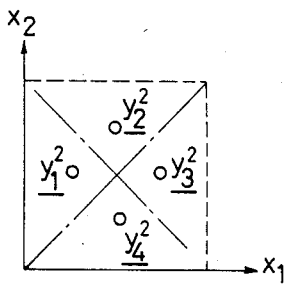
Figure 18C:
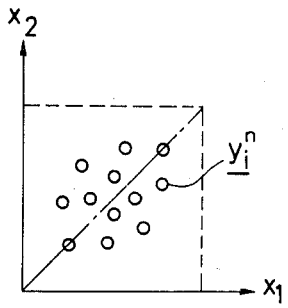

The arrangement of output vectors in a two dimentional plane in each-stage of partition with respect to the input vector is shown in FIG. 18: FIG. 18(a) refers to the first stage, 18(b) refers to the second stage, and 18(c) refers to the nth stage.

Figure 19:
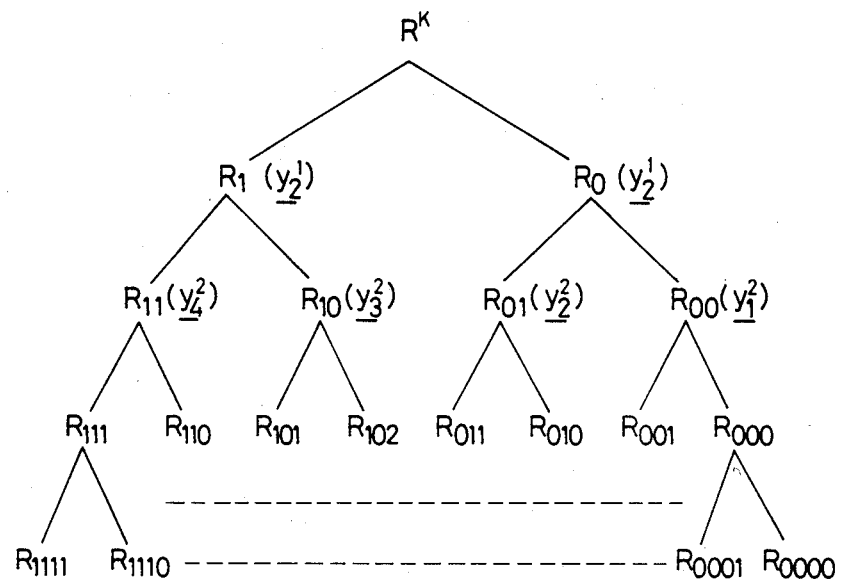
FIG. 19 shows the sequence of the multi-stage partition of a multi-dimensional signal space according to the method of vector quantization used in the present invention.

FIG. 19 shows a tree structure that describes the procedure of partitioning the signal space $R^k$ into subspaces. Subspaces obtained by partition at each stage have their respective representative points $y_i^n$. The input vector x belongs to any one of the subspaces obtained in each stage, and by searching through the tree of FIG. 19, a decision is made to as to which one of the N subspaces obtained in the nth stage the input vector x belongs to. FIG. 19 shows the representative points for the respective subspaces obtained up to the (n−1)th stage, but it should be noted that these representative points are not the output vectors onto which the input vector is to be finally mapped. In other words, it is the representative points in the subspaces obtained in the final stage of partition that make up a set of the actual output vectors. The index i minus "1" for each subspaces $R_i$ and the output vector $y_i^n = (y_{i1}, y_{i2}, \ldots, y_{ik})^n$ obtained at the nth stage is written as n(B)1 or n(B)0 using a binary code. In other words, the least significant bit of the subspace that is branched from each node of the tree in the right-hand direction is 0, whereas the subspaces branching in the left direction have a least significant bit 1. The symbol n(B)(1 or 0) is the same as the subscript to the subspace at the last node and represents the history of the specific subspace.

By performing vector quantization on a tree as described above, the number of calculations of the distortion between the input and output vectors and that of the comparisons between the so calculated distortions to find the least distorted output vectors are reduced to $2\log_2 n$. This represents a marked improvement in processing time over the conventional technique of vector quantization that must repeat calculations and comparisons for the detection of the least distorted output vector as many as n times. This improvement is as great as the advantage the high-speed Fourier transform has over the ordinary Fourier transform.

Figure 21:
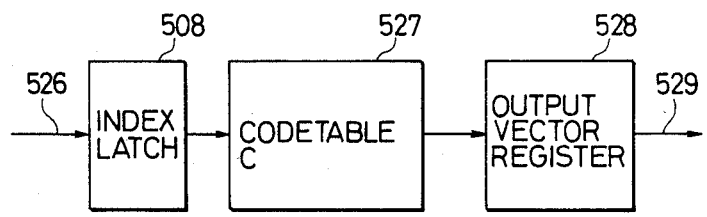
FIG. 21 is a block diagram showing one embodiment of the decoder of the vector quantizer of the present invention.
Figure 20:
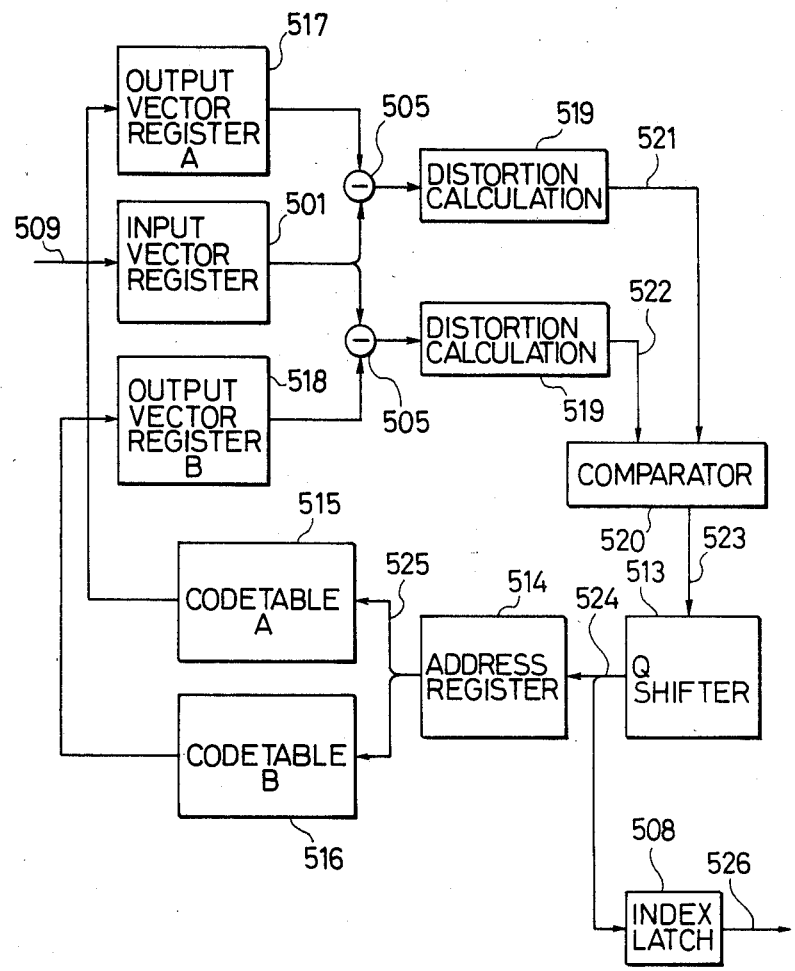
FIG. 20 is a block diagram showing one embodiment of the coder of the vector quantizer of the present invention.

One embodiment of the coder for the vector quantizer of this embodiment is shown in FIG. 20, and one embodiment of the decoder is illustrated in FIG. 21. The coder of FIG. 20 comprises an input vector register 501, a vector subtractor 505, an index latch 508, a Q shifter 513, an address register 514, a codetable 515, a codetable B 516, an output vector register A 517, an output vector register B 518, a distortion calculator 519, and a comparator 520. The decoder of FIG. 21 comprises an index latch 508, a codetable C 527 and an output vector register C 528.

The coder of FIG. 20 is operated as follows. First, a sequence 509 of incoming signals are divided into blocks each consisting of k samples and are fed into the input vector register 501 as an input vector $X=(x_1, x_2, \ldots x_k)$. At the same time, for the purpose of searching through the tree of FIG. 19 for the least distorted output vector, pairs of output vectors $y_{i(B)0}^n$ and $y_{i(B)0}^n$ are read at each stage of division from the codetable A 515 and codetable B 516. To this end, each codetable must be addressed in a manner adapted to the searching through the tree.

In arranging a set of output vectors $y_i^n$ at each stage in a codetable memory, if the index i minus "1" is expressed by a binary code and if n(B)0 and n(B)1 indicating the history of the tree are directly used in addressing the coding table, there occurs an overlap between the addresses of the output vectors at each stage. To avoid this problem, the numeral "1" is placed as the most significant bit in each stage, thus indicating the address of a specific output vector by 1n(B)1 or 1n(B)0. By so doing, an output vector $y_2^1$ is written at a location $11_B$ (B stands for a binary code) in the first stage, and $y_1^1$ is written at a location $10_B$. In the second stage, $y_4^2$ is written at a location $111_B$, $y_3^2$ at $110_B$, $y_2^2$ at $101_B$, and $y_1^2$ at $100E$. In a similar manner, $y_i^2$ is written at a location 1n(B)1 in the nth stage. For each stage, those output vectors which have a least significant bit "0" in their address are written in codetable A 515, and those having a least significant bit "1" are written in codetable B 516. In other words, the output vectors branching in the right direction from each node in the tree of FIG. 19 are written in table A 515, and those branching in the left direction are written in table B 516.

The coder of FIG. 20 starts to search through the tree of FIG. 19 by first loading the Q shifter 513 with a "1", After latching it in the address register 514, the coder addresses an output vector $y_1^1$ at a location $10_B$ in table A 515 and an output vector $y_2^1$ at a location $11_B$ in table B 516. The respective output vectors are fed into the registers A 517 and B 518, then to subtractors 505 and distortion calculators 519 for computing their distortions d(x, $y_i$) from the input vector x using the following equation:

$$d(\underline{x}, \underline{y}_i) = \max_j |x_j - y_{ij}|.$$

Subsequently, the distortion 521 between the input vector X and output vector $y_1^1$ is compared in the comparator 520 with the distortion 522 between the input vector X and the output vector $y_2^1$. If the distortion of the output vector $y_1^1$ read from table A 515 is smaller, the comparator 520 outputs "0", and if the distortion of output vector $y_2^1$ is smaller, it outputs "1". The comparator output 523 is sent to the Q shifter 503, where it is placed as the least significant bit after shifting the previous content of the shifter by one digit. Therefore, after the first stage of the search, the content of the Q shifter 513 is either $11_B$ or $10_B$. This content is forwarded to the address register 514 as address data 524 for making the second stage of the search.

By repeating similar procedures n times, the content of the shifter 513 becomes 1n(B)1 or 1n(B)0, and finally, the input vector X is mapped onto one of the N ($=2^n$) output vectors that is the least distorted from the input vector X, and the obtained address data 524 is stored in the index latch 508. By removing the most significant bit "1" from the address data 524 at the completion of searching, a coder output 526 having a 1:1 correspondence to the index of the least distorted output vector is obtained.

In the decoder of FIG. 21, the coder output 526 is fed to the index latch 508 and is used as an address data for reading from the codetable C 527 an output vector that corresponds to the index i (i.e. n(B)1 or n(B)0). In the table C, only the set of $n^{th}$ stage output vectors $y_i^n$ as read out from the coding tables A 515 and B 516 in the $n^{th}$ stage have been written. The output vector $y_i^n$ is then fed to the register C 528 from which it is supplied as the final output signal 529 of the vector quantizer.

As will be understood from the foregoing description, the vector quantizaer of the present invention can complete the processing of incoming signals within a time tv represented by the following formula:

$$tv = (\log_2 N) \cdot td/k = n \cdot td/k$$

wherein td is the time necessary for calculating the distortions between input and output vectors. Therefore, the processing speed of the vector quantizer of the present invention is increased exponentially as compared with the conventional machine.

In the foregoing, the calculation of the distortion between input and output vectors at each stage of searching through the tree is affected by the same coder, but it should be understood that the same purpose can be attained by cascade-connecting the n stages of the search into a pipeline configuration. More specifically, the index of an output vector $y_i^{n-1}$ in one stage is fed to the next stage, and each of the two output vectors read from the codetables in the next stage is calculated for its distortion from the input vector, so as to eventually detect the least distorted output vector.

As will be apparent from the foregoing explanation, the vector quantizer of this example quantizes incoming signals in a multi-dimensional signal space by searching through a tree structure wherein the signal space is partitioned into two subspaces at each stage. This increases the processing speed exponentially as compared with the conventional vector quantizer, and in spite of this great increase in the processing speed, the quantizer nonetheless accomplishes reliable coding of the input signals.

EXAMPLE 6

Figure 22:
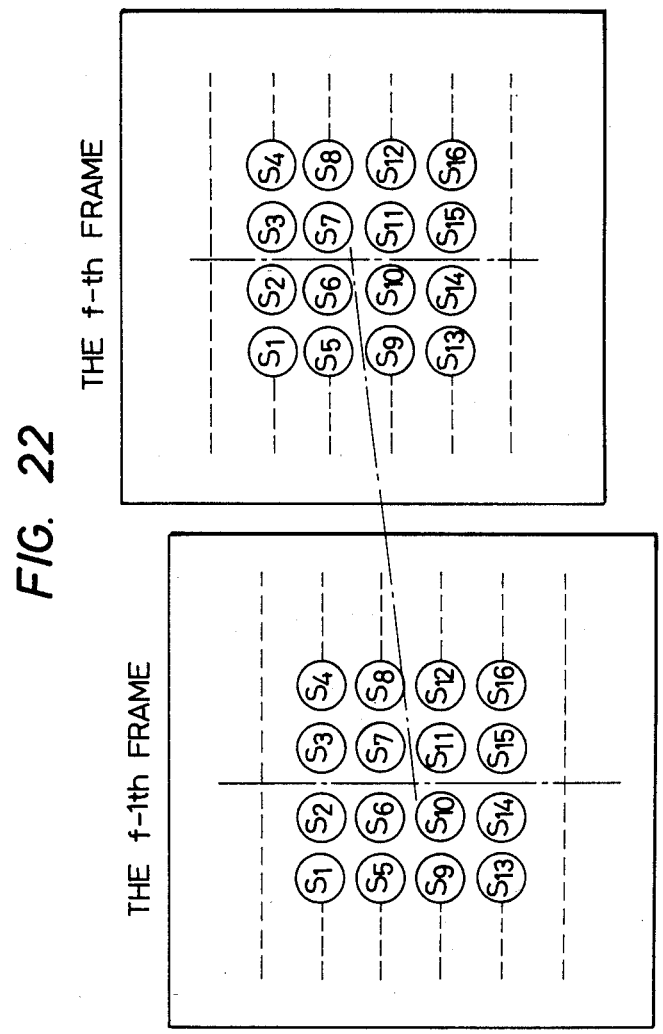
FIG. 22 shows how samples of an interframe block-scanned video signal are arranged on frames.

An apparatus according to a further embodiment will now be described in detail by reference to the accompanying drawings. The left-hand side of FIG. 22 shows the (f−1)th frame (in television, one frame consists of two fields to be subjected to interlace scanning). Selecting four scanning lines that are continuous on a time basis, and picking up four samples on each line to provide a block of 16 (4×4) samples in a lattice pattern, we denote this block as a set of vectors $S_l^{f-1} = (S_1, S_2, \ldots, S_{16})_l^{f-1}$. The right-hand side of FIG. 22 shows the f-th frame which is one frame (in television scanning, two fields) after the (f−1)th frame. Sixteen samples at the same positions as those of $S_l^f$ are selected from four continuous scanning lines, and the square block of those samples are denoted as a set of vectors $S_l^f = (S_1, S_2, S_2, \ldots, S_{16})_l^f$. In either vector set, the symbol l is an integer and indicates the sequence number of a specific block that is shifting on a frame from left to right and from top to bottom.

The present embodiment provides an interframe coding apparatus that achieves high-efficiency coding by performing motion detection and vector quantization on the basis of a block of 4×4 interframe differential signals.

Figure 23:
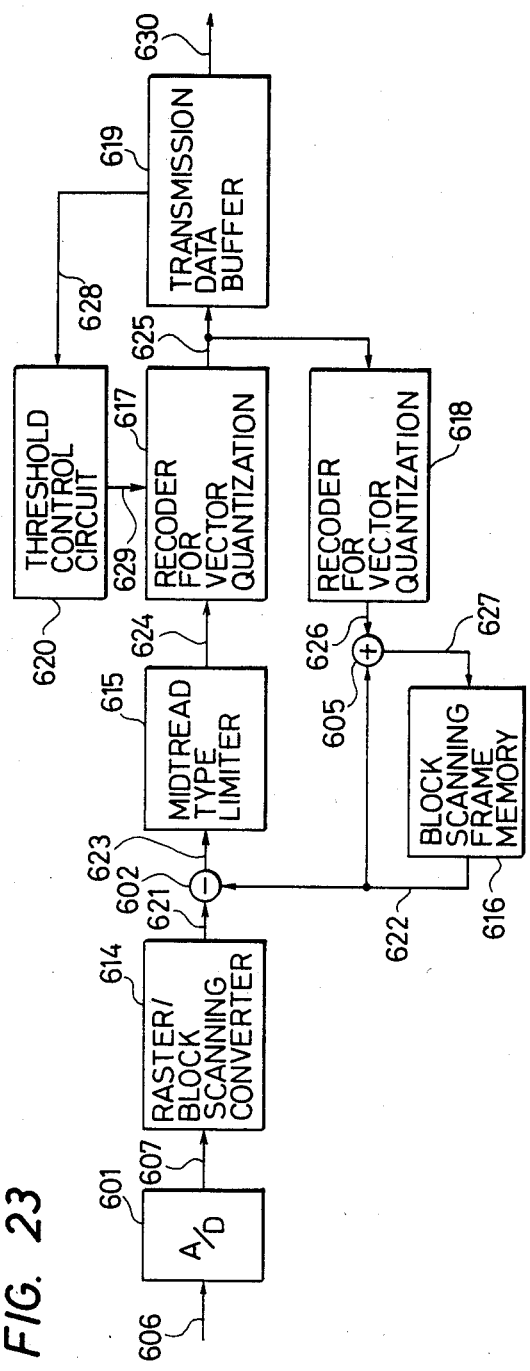
FIG. 23 is a block diagram showing one embodiment of the coding unit of the interframe coding apparatus using vector quantization according to the present invention.
Figure 24:
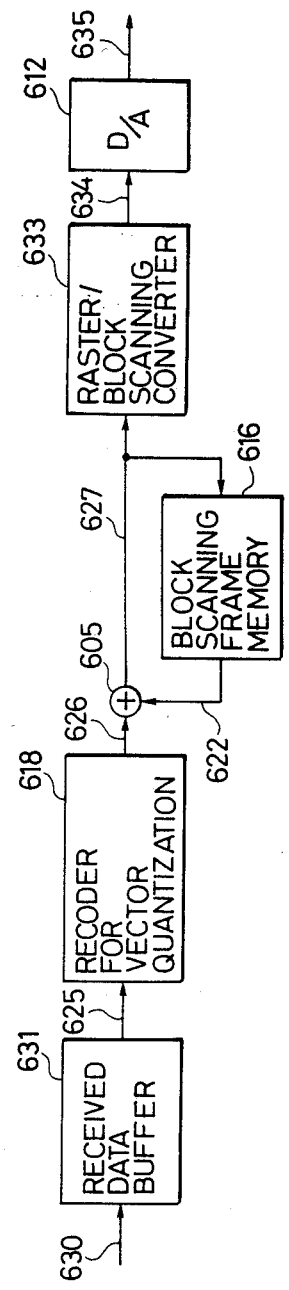
FIG. 24 is a block diagram showing one embodiment of the decoding unit of the same interframe coding apparatus.

FIG. 23 is a block diagram showing one embodiment of the coding unit of the interframe coding apparatus. FIG. 24 is a block diagram showing one embodiment of the decoding unit of that coding apparatus. In FIG. 23, 614 is a raster/block scanning converter, 615 is a midtread type limiter, 616 is a block scanning frame memory, 617 is a coder for quantization, 618 is a decoder for vector quantization, 619 is a transmission data buffer, and 620 is a threshold control circuit. In FIG. 24, 631 is a received data buffer, and 633 is a block/raster scanning converter. In FIGS. 23 and 24, like numerals identify like or equivalent parts.

The coding unit of FIG. 23 is operated as follows. The digitized video signal 607 for the f-th frame is fed to the raster/block scanning converter 614 to shift the raster scanning to block scanning of the type shown in FIG. 22. In block scanning, individual samples of the video signal are scanned in the order of $(S_1, S_2, S_3, S_4, S_5, S_6, \ldots, S_9, S_{10}, \ldots, S_{13}, S_{14}, S_{15}, S_{16})_l$, and this block scanning procedure proceeds from left to right and from top to bottom of the frame. As a result, a block-scanned video signal 621 is delivered from the converter 614. It should be noted that the direction of principal scanning is interchangeable with that of the sub-scanning within a specific block.

Figure 25:
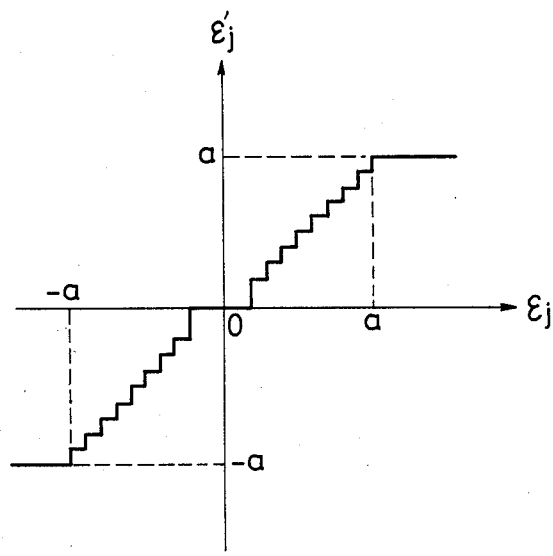
FIG. 25 illustrates the input-output conversion characteristics of a limiter used in processing interframe differential signals in the present invention.

The block-scanned video signal 621 or the vector set $S_l^f$ is sent to the subtractor 602 where a block scanning predictive signal 622 or $\underline{\hat{P}}_l^f = (\hat{P}_1, \hat{P}_2, \ldots, \hat{P}_{16})_l$ read from the block scanning frame memory 616 is subtracted from each element (a corresponding sample) of $S_l^f$ to produce a perdictive error signal 623 or $\epsilon_l = (\epsilon_1, \epsilon_2, \ldots, \epsilon_{16})_l$ as an output of the subtractor 602. The signal 623 is fed to the midtread type limiter 615. This limiter has input-output conversion characteristics as shown in FIG. 25 (wherein the symbol a indicates the limiter level constant) and converts the signal 623 to a suppressed predictive error signal 624 or $\epsilon'_l = (\epsilon'_1, \epsilon'_2, \ldots, \epsilon'_{16})'_l$ with small level variation in the direction of the time base and the cverload suppressed. This suppressed predictive error signal 624 in block form is fed thorugh the coder 617 and decoder 618 for vector quantization to provide a vector quantized predictive error signal 626 or $\hat{\epsilon}_l = (\hat{\epsilon}_1, \hat{\epsilon}_2, \ldots, \hat{\epsilon}_{16})_l$. This vector set is sent to the adder 625 where the respective elements are summed with the block scanning predictive signal 622 to provide a reproduced block scanned video signal 627 $\hat{S}^f = (\hat{S}_1, \hat{S}_2, \ldots, \hat{S}_{16})_l^f$. This signal 627 is then fed to the block scanning frame memory 616 where it is delayed by one frame in preparation for use as a block scanning predictive signal 622 for the next frame.

The above-described interframe differential operations are represented by the following operations with vectors:

$$\epsilon_l = S_l^f - P_l^f$$

$$\hat{\epsilon}_l = \epsilon_l = Q_l$$

$$\hat{S}_l' = \hat{P}_l' + \hat{\epsilon}_l = \hat{S}_l' = Q_l$$

$$\hat{P}_l' = \hat{S}_l' \cdot Z^{-f}$$

wherein $Z^{-f}$ represents a one-frame delay; $Q_l$ is an operational error resulting from the midtread type limiter 615 and vector quantization of $\epsilon_l$.

In the processing described above, the coder 617 performs the following operation on the block of suppressed predictive signals 424 for the purpose of efficient coding. If each of the mean value and the standard deviation (or equivalent components thereof) for the block $\epsilon'_l = (\epsilon_1, \epsilon_2, \ldots, \epsilon_{16})'_l$ exceed a threshold value $T\theta$, that block is taken as a significant block with motion and is subjected to vector quantization. If neither the block mean nor standard deviation exceeds the threshold value $T\theta$, the block is taken as an insignificant block and is processed to provide a vector-quantized predictive error signal 626 $\hat{\epsilon}_l$ which equals zero. Details of this vector quantization will be given later in this specification. The decoder 617 delivers vector-quantized coded data 625 as an output which is further sent to the transmission data buffer 619. To prevent the overflow of the buffer 619, the amount of information produced from the coded data 625 is controlled by sending an information production control signal 628 to the threshold control circuit 620, which permits vector-quantized coded data 628 to be transmitted at a constant rate. In response to the control signal 628, the threshold control circuit 620 feeds a threshold value signal 629 back to the coder 617. The threshold value T8 is preferably controlled on a frame basis. Freeze of frames can be accomplished by holding $T\theta$ greater than $2a$ throughout one frame period.

The operation of the decoder unit of the interframe coding apparatus of the present invention will hereunder be described by reference to FIG. 24. The vector-quantized coded data 630 is passed through the received data buffer 631 from which it is delivered as coded data 626 having a different velocity. It is then fed to the decoder 618 for conversion into a vector-quantized predictive error signal 626 or $\hat{\epsilon}_l$. This signal is sent to the adder 605 where it is summed with the signal 622 from the block scanning frame memory 616 so as to provide a reproduced block scanned video signal 627 or $\hat{S}_l'$ following an order reverse to that used in the interframe coding operation. The vector operation performed to reconstruct the signal 627 is as follows: $\hat{S}_l' = \hat{P}_l' + \hat{\epsilon}_l = \hat{S}_l' + Q_l$. The reproduced signal 627 is fed to the raster/block scanning converter 633 where it is converted to a raster scanned reproduced video signal 634. The signal 634 is then D/A converted to obtain an analog reproduced signal.

Figure 26A:
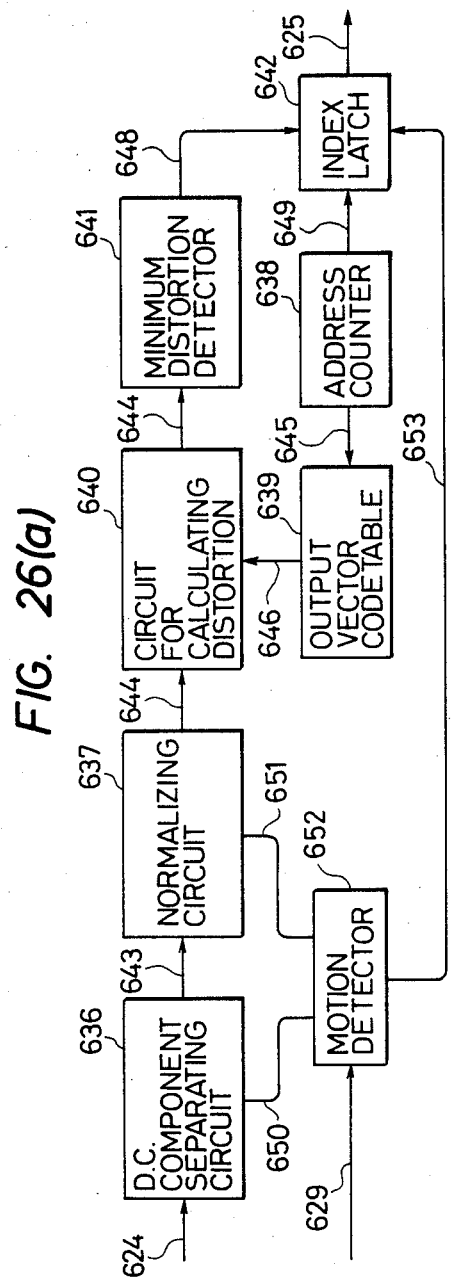
FIG. 26(a) is a block diagram showing one embodiment of the coder of the vector quantizer used in the present invention.
Figure 26B:
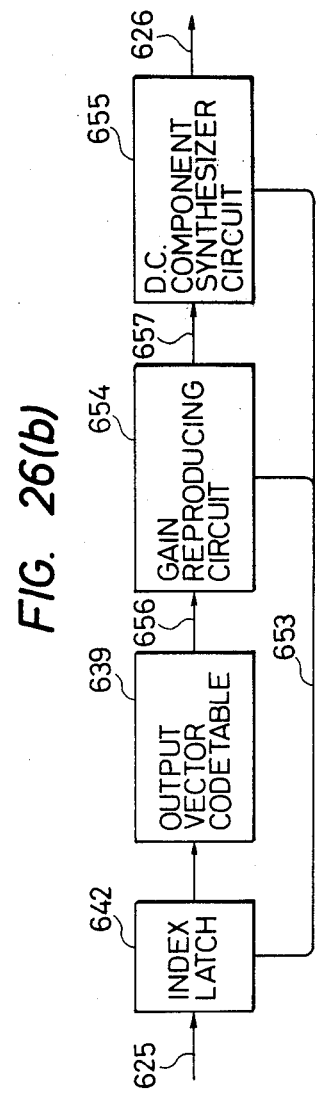
FIG. 26(b) is a block diagram showing one embodiment of the decoder of the same vector quantizer.

High-efficiency coding can be accomplished by compressing the data of the block scanning predictive error signal or interframe differential signal. For this purpose, a vector quantizer is used and its details are described hereunder. FIG. 26(a) is a block diagram showing one embodiment of the coder of the vector quantizer, and FIG. 26(b) is a block diagram showing one embodiment of the decoder of that quantizer. In these figures, 636 is a d.c. component separating circuit, 637 is a normalizing circuit, 638 is an address counter, 639 is an output vector codetable, 640 is a circuit for calculating the distortion between input and output vectors, 641 is a minimum distortion detector, 642 is an index latch, 652 is a motion detector circuit, 654 is a gain reproducing circuit, and 655 is a d.c. component synthesizer circuit. In the drawings, like numerals identify like or equivalent parts.

The vector quantizer used in this embodiment is operated as follows. In the coder of FIG. 26(a), the suppressed predetective error signal 624 or $\epsilon'_l$ is fed to the d.c. component separating circuit 646 and normalizing circuit 637 where it is subjected to the following operation for conversion into an input vector 644 or $X_l$. If $m_l$ and $\sigma_l$ are respectively written for the mean value and standard deviation (or equivalent components thereof) of the elements of the block $\epsilon' = (\epsilon'_1, \epsilon'_2, \ldots, \epsilon'_{16})_l$, the two parameters and the input vector X can be calculated by the following formulas:

$$m_l = \frac{1}{16} \sum_{j=1}^{16} \epsilon_j' \quad (j = 1, 2, \ldots, 16);$$

$$\sigma_l = \left[ \frac{1}{16} \sum_{j=1}^{16} (\epsilon_j' - m_l)^2 \right]^{\frac{1}{2}} \text{ or}$$

$$\sigma_l = \max_j \epsilon_j' - \min_j \epsilon_j' \text{ or}$$

$$\sigma_l = \frac{1}{16} \sum_{j=1}^{16} \epsilon_j' - m_l$$

$$X_j = (\epsilon_j' - m_l)/\sigma_l,$$

$$\underline{X}_l = [X_1, X_2, \ldots, X_{16}]_l.$$

The mean signal 650 $m_l$ and standard deviation signal 651 $\sigma_l$ are sent to the motion detector circuit 652 where they are compared with a threshold value signal 629 to check if the signal samples in the block $\epsilon_l$ are those of an interframe differential signal indicating significant motion. If $m_l < T\theta$ and $\sigma_l < T\theta$, the circuit 652 performs an operation to establish $m_l = \sigma_l = 0$, and the so processed $m_l$ and $\sigma_l$ are sent to the index latch 642 as a block mean and standard deviation signal 653. If $m_l = \sigma_l = 0$, the index latch 642 concludes that $\epsilon'_l$ is a motionless insignificant block and sends only an insignificant code (1 bit) as the coded data 625 for vector-quantized $\epsilon'_l$. If $m_l \neq 0$ or $\sigma_l \neq 0$, a significant block code (1 bit), as well as $m_l$, $\sigma_l$ and an output vector index signal 649 to be described later in this specification are sent out of the index latch 642 as components of the vector-quantized coded data 625. Thus, the code for distinguishing between significant and insignificant blocks can be used as a prefix in preparing the vector-quantized data 625 by variable word length coding (e.g. Haffmann coding). As a result, a block made of motionless samples can be coded with high efficiency, requiring only one bit for the insignificant block code (i.e. 1/16 bit per sample).

Vector quantization also assures high-efficiency coding of significant blocks, the principles of which were earlier described. Briefly, assuming an input vector $X = (x_1, x_2, \ldots, x_k)$ consisting of a block of K input signal samples (K being a positive integer) and a K-dimentional Euclidean signal space $R^k$ ($X \in R^k$) partitioned into a finite number of subspaces $R_1, R_2, \ldots, R_N$, we let $Y = (y_1, y_2, \ldots, y_N)$ be a set of output vectors $y_i = (y_{i1}, y_{i2}, \ldots, y_{ik})$ which are N representative points (e.g. the center of gravity) of the respective subspaces. Vector quantization is the mapping of a representative point $y_i$ as the output vector of the input vector X included in a specific subspace $R_i$.

Therefore, vector quantization Qv can be defined as follows:

$$Q_V : R^k \to Y$$

wherein $$R_1 = Q_V^{-1}(y_i) = [\underline{X} \epsilon R^k : Q(\underline{X}) = y_i], \bigcup_{i=1}^{N} R_i = R^k, R_i \cap R_j = 0 \ (i \neq j).$$

This vector quantization assures a very efficient coding by transmitting or recording the coded output.

In vector quantization, the output vector set Y can be obtained by clustering. This is a technique of converging a number of input vectors X, which originate from a model of input signal source based on the amplitude probability distribution P(X) of input vectors, until the total sum of the distortions between the input vectors and the output vectors (the latter being preliminarily determined by initializing) in the X-dimentional signal space $R_k$ becomes a minimum. That total sum of the distortions is expressed as $$\sum_l \min_i d(\underline{X}_l, y_i).$$

Figure 27:
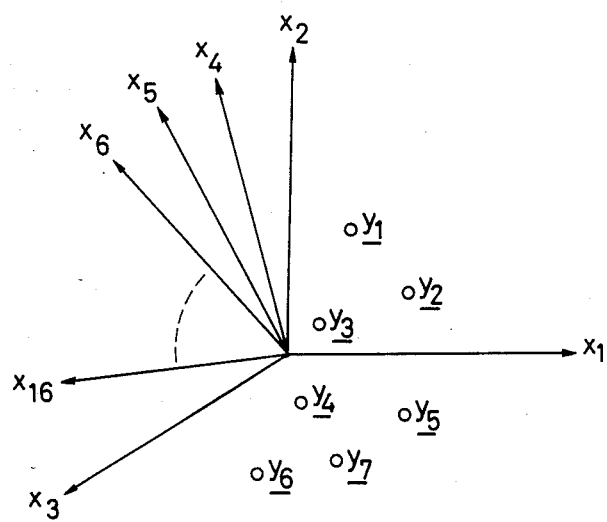
FIG. 27 illustrates the relationship between input and output vectors in a 16-dimensional signal space during vector quantization.

FIG. 27 shows one example of the arrangement of output vectors in a 16-dimentional signal space $R^{16}$.

To state more specifically, vector quantization is the cascade connection between the coding (C) which is the mapping of $R^k$ onto the index of an output vector which is the closest to (or the least distorted from) the input vector X and the decoding (D) which is the mapping of that index onto the least distorted output vector. C and D are defined by the following formulas:

$$C: \underline{X} \to i = \left[ i | \min_i d(\underline{X}, y_i) \right]$$

$$D: i = [i | \min_j d(\underline{X}, y_j)] \ y_i = \left[ y_i | \min_j d(\underline{X}, y_j) \right]$$

The distortion $d(X, Y_i)$ can be defined by the Euclidean distance as follows:

$$d(\underline{X}, y_i) = \left[ \sum_{j=1}^{k} (X_j - y_{ij})^2 \right]^{\frac{1}{2}}$$

For faster calculation of the distortion, the Hausdorff distance may be used:

$$d(\underline{X}, y_i) = \max_j |X_j - y_{ij}|.$$

The sum of absolute values can also be used for calculation of the distortion:

$$d(\underline{X}, y_i) = \sum_{j=1}^{k} |X_j - y_{ij}|.$$

Before starting the above vector quantization procedure, the set of output vectors that have been produced by the clustering technique is written into the output vector coding table 639 of the coder of FIG. 26(a). When an input vector 644 or X is fed to the distortion calculator circuit 640, the address counter 628 counts the index number from 1 to N so as to read corresponding output vectors $y_i = y_1, y_2, \ldots, y_N$ successively from the coding table 639. The circuit 640 then calculates the distortion $d(X, y_i)$ between the input vector X and each of the output vectors $y_i$, and delivers a train of distortion signals 644 into the minimum distortion detector 641 so as to determine $$\min_i (X, y_i)$$

for $i = 1, 2, \ldots, N$. More specifically, if a certain value of $d(X, y_i)$ is found to be smaller than the last detected minimum value as a result of sequential counting with the address counter 638 in the order of $i = 1, 2, \ldots, N$, that smaller value is latched as a new minimum distortion. Upon detection of every new minimum distortion, the detector 641 sends a strobe signal 648, and at the same time, a corresponding address signal 649 is loaded into the index latch 642. By continuing this operation until $i = N$, the index for the least distorted output vector can be loaded in the index latch 642. This index, as well as the mean and standard deviation signal 653 for a moving block and the code for distinguishing between significant and insignificant blocks are altogether sent out of the index latch 642 as vector-quantized coded data 625.

The decoder of FIG. 26(b) in the vector quantizer operates as follows: First, the vector-quantized coded data 625 consisting of the code for distinguishing between significant and insignificant blocks, the index, and the block mean and standard deviation signal 653 is loaded into the index latch 642. The index is sent to the output vector codetable 639 which is the same as that used in the coder of FIG. 26(a), and a corresponding output vector 656 or $$y_i = \left[ y_i | \min_i d(\underline{X}_l, y_i) \right]$$

is read from that table. The The output vector $y_i$ is fed to the gain reproducing circuit 654 where it is multiplied with the standard deviation signal $\sigma_l$ to provide a signal 657 with a reproduced gain, and thereafter, the signal 657 is forwarded to the a.c. component synthesizer circuit 655 where it is combined with the mean signal $m_l$ to finally provide a reproduced predictive error signal 626 $\epsilon_l$. This sequence is illustrated by the following operations:

$$\hat{\epsilon}_j = \sigma_l \cdot Y_{ij} + M_l (j = 1, 2, \ldots, 16)$$

$$\hat{\epsilon}_l = (\hat{\epsilon}_1, \hat{\epsilon}_2, \ldots, \hat{\epsilon}_{16})_l$$

provided that $\hat{\epsilon}_l = (0, 0, \ldots, 0)_l$ if $m_l = \sigma_l = 0$.

The interframe coding apparatus of the present invention which employs the technique of vector quantization has various advantages. First, it reduces the number of quantizing levels by supressing the granular noise contained in interframe differential signals in the direction of the time base, as well as the overload with the aid or a midtread type limiter. Secondly, the apparatus groups a predetermined number of interframe differential signals into blocks and distinguishes a significant block from an insignificant block by detecting scene motions in terms of the block mean and standard deviation (or equivalent components thereof). As a result, the apparatus can selectively detect only significant motion with higher precision in spite of disturbance noises, and at the same time, it is capable of accomplishing highly efficient coding. If a certain block of interframe differential signals is found to have significant motion, they are individually separated from their block mean and are normalized by the gain. The normalized signals are subjected to vector quantization in a multi-dimensional signal space including these signals as a set of input vectors. This process also helps increase the efficiency of coding by the apparatus of the present invention. According to the present invention, the vector quantization of normalized signals can be effected with high efficiency because after separation of the mean value and the normalization step, the video signals become similar to each other with respect to pictorial scenes having different amplitude probability distributions. Since vector normalization is performed on normalized signals not individually, but in a block form, the interframe coding operation can be checked for an interframe transmission error by occasionally performing direct vector quantization on the block-scanned video signal 621.

The foregoing descriptions of the present embodiment assume that vector quantization is performed on a block of 16 (4×4) input signal samples, but it should be understood that other block sizes can also be used. In the last illustrated embodiment, the vector quantization process assumes a full search that involves calculating the distortions between all input and output vectors, but alternatively, the output vectors may be generated in a tree structure which is to be searched for accomplishing faster vector quantization. In another modification, values other than the block mean and standard deviation may be used as the threshold values for the detection of significant frame motion.

As described in the foregoing, an interframe coding apparatus of the present invention is designed to achieve highly efficient coding by performing vector quantization on d.c. component-free, normalized interframe differential signals after they have been suppressed in noise and only significant frame motions have been detected. Because of these features, the apparatus of the present invention can transmit moving pictures of high quality at a very low bit rate.

What is claimed is:

1. A vector quantizer, comprising; an output vector codetable for partitioning a K-dimensional Euclidean signal space having an input vector consisted of K input samples (K being an integer larger than 1) to provide subspace having minimum distorted partitions with respect to the probability density of said input samples and for storing the representative output vectors of said subspaces; a subtractor for calculating the difference between the output vectors successively read from said codetable and said input vectors with respect to the individual components thereof; an absolute value corrector for converting each component of the output of said subtractor into an absolute value for determining the distortion of each element; a maximum element distortion detector for determining the distortion of each element; a maximum element distortion detector for determining a maximum distortion by comparing the distortions of the respective components; a least distorted output vector detector for detecting an output vector having the least maximum distortion of the output components successively collated with said input vector; a coding output circuit for outputting a coded address of said output vector codetable that corresponds to said least distorted output vector; and a decoder that decodes the coded output of said address in the output vector codetable so as to read out a corresponding vector output having a minimum distortion from the intput vector.

2. A vector quantizer, comprising; an input vector register for dividing an incoming signal sequence into a block of K (K being more than one) signals to form an input vector; an output vector codetable wherein a k-dimensional Euclidean signal space $R^k$ containing said input vector is successively partitioned into two subspaces in successive stages of a tree structure and the typical points for the $2^n$ subspaces obtained from the signal space $R^k$ at the $n^{th}$ stage (n being a positive integer) are stored as a set of output vectors; a distortion computing section for calculating the distance, in the k-dimensional signal space, of the input vector from each of the two output vectors prepared at each stage, comparing the two distances, and detecting an output vector which is less distorted from the input vector; an address control section for further partitioning into two portions the subspace having said detected output vector as its representative point and for reading the resulting two output vectors from said output vector codetable; and a coded output producing section that partitions said signal space n times, detects, by searching through the tree structure, the least distorted output vector from among the $2^n$ output vectors, and which encodes the address of said least distorted output vector.

3. A vector quantizer according to claim 2, and further including a distortion computing section for determining the distance, in the k-dimensional signal space, of the input vector from each of the two output vectors being compared with each other by searching through the tree structure, by approximation using the maximum value of the absolute value of the difference between each vector component, a signal specifying the direction for the next searching step being produced as a result of the comparison between the two distances.

* * * * *